US008468397B2

(12) United States Patent
Yamazaki

(10) Patent No.: US 8,468,397 B2
(45) Date of Patent: Jun. 18, 2013

(54) ERROR CONTROLLING SYSTEM, PROCESSOR AND ERROR INJECTION METHOD

(75) Inventor: Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 12/974,336

(22) Filed: Dec. 21, 2010

(65) Prior Publication Data

US 2011/0161747 A1   Jun. 30, 2011

(30) Foreign Application Priority Data

Dec. 25, 2009   (JP) .................................. 2009-296260

(51) Int. Cl.
*G06F 11/00* (2006.01)
*H04L 1/24* (2006.01)

(52) U.S. Cl.
CPC ...................................... *H04L 1/241* (2013.01)
USPC .............................. 714/705; 714/723; 714/744

(58) Field of Classification Search
USPC ........................................................ 714/705
See application file for complete search history.

(56) References Cited

U.S. PATENT DOCUMENTS

| 5,293,572 | A  | * | 3/1994  | Hasegawa et al. ............ 714/703 |
| 6,088,829 | A  | * | 7/2000  | Umemura et al. ............ 714/798 |
| 6,301,685 | B1 | * | 10/2001 | Shigeta ........................ 714/799 |
| 6,543,014 | B1 | * | 4/2003  | Okuyama et al. ............ 714/712 |
| 6,816,992 | B2 | * | 11/2004 | Eby ............................... 714/739 |
| 7,222,270 | B2 | * | 5/2007  | Meaney et al. ................. 714/48 |
| 7,669,095 | B2 | * | 2/2010  | Clark et al. .................... 714/724 |
| 2004/0034820 | A1 | * | 2/2004  | Soltis et al. ..................... 714/47 |
| 2004/0243882 | A1 | * | 12/2004 | Zhou ............................... 714/38 |
| 2007/0174679 | A1 | * | 7/2007  | Chelstrom et al. ................ 714/8 |
| 2008/0141105 | A1 | * | 6/2008  | Fujita ............................. 714/807 |
| 2009/0249148 | A1 | * | 10/2009 | Ito et al. ......................... 714/746 |
| 2012/0166906 | A1 | * | 6/2012  | Nagadomi et al. ............ 714/755 |

FOREIGN PATENT DOCUMENTS

| JP | 56-21253  | 2/1981  |
| JP | 58-39351  | 3/1983  |
| JP | 59-87560  | 5/1984  |
| JP | 64-82140  | 3/1989  |
| JP | 1-261732  | 10/1989 |
| JP | 4-369046  | 12/1992 |

* cited by examiner

*Primary Examiner* — Ajay Bhatia
*Assistant Examiner* — Colin Baird
(74) *Attorney, Agent, or Firm* — Staas & Halsey LLP

(57) ABSTRACT

An error controlling system includes a plurality of error generation target circuits, a plurality of pseudo error generating devices each having a pseudo error content holding register that holds directed pseudo error content, each plurality of pseudo error generating device generates a pseudo error corresponding to a pseudo error content held in a respective pseudo error content holding register in at least one of data to be written to one of the plurality of error generation target circuits and data to be read from one of the plurality of error generation target circuits upon being directed to generate the pseudo error, and a pseudo error controlling device that directs the plurality of pseudo error generating devices to generate a pseudo error corresponding to a respective pseudo error content held in each of the pseudo error content holding register provided in each of the plurality of pseudo error generating devices.

15 Claims, 10 Drawing Sheets

FIG. 3

| | |
|---|---|
| PSEUDO ERROR CONTROLLING DEVICE | ERROR GENERATION TARGET DEVICE |
| | NUMBER OF TIMES OF PSEUDO ERROR GENERATION |
| | PSEUDO ERROR GENERATION TARGET BIT |
| | WHETHER PSEUDO ERROR IS GENERATED IN WRITING OR READING ACCESS |
| PSEUDO ERROR GENERATING DEVICE | ADDRESS ON WHICH PSEUDO ERROR IS GENERATED (IN CASE OF RAM) |
| | WAY NUMBER OF DEVICE IN WHICH PSEUDO ERROR IS GENERATED (IN CASE OF SET-ASSOCIATIVE RAM) |
| | EVENT IN WHICH PSEUDO ERROR IS GENERATED (PIPELINE REQUEST TYPE) |

ERROR CONTROLLING SYSTEM, PROCESSOR AND ERROR INJECTION METHOD

CROSS-REFERENCE TO RELATED APPLICATIONS

This application is based upon and claims priority to prior Japanese Patent Application No. 2009-296260 filed on Dec. 25, 2009 in the Japan Patent Office, the entire contents of which are incorporated herein by reference.

BACKGROUND

1. Field

Various embodiments of the present invention relate to an error controlling system, a processor and an error injection method.

2. Description of the Related Art

An ordinary information processing apparatus such as a server is provided with a mechanism to be ready for an occurrence of an error and to solve the error in some cases. An enterprise server is required as an information processing apparatus to be reliable enough to continue operation without outputting an incorrect result even in case of an error occurrence, and an ordinary processor for server-use such as a CPU (Central Processing Unit) to be integrated in such an enterprise server is provided with mechanisms for detecting an error and for recovering from the error.

An error that occurs in an information processing apparatus may be, e.g., a permanent error of a semiconductor component caused by poor hardware manufacturing or aging degradation, or an intermittent soft error occurrence caused in a semiconductor component by cosmic rays or radial rays.

An information processing apparatus provided with a mechanism for detecting and recovering from an error, so-called a RAS (Reliability, Availability and Serviceability) mechanism, is generally required to examine an operation of the RAS mechanism. It is difficult to check whether the RAS mechanism correctly works after an error actually occurs. Thus, a circuit in which a pseudo error is embedded for checking an operation of the RAS mechanism is typical.

An error injection circuit has successively increased pseudo error generating patterns in accordance with error modes which have ordinarily occurred, where various pseudo error generating mechanisms have been devised. To put it specifically, an art for integrating a plurality of errors between an instruction to start to generate a pseudo error and an instruction to finish generating the pseudo error or for a regular period of time since the instruction to start to generate the pseudo error is typical. Further, an art for generating pseudo errors a specified number of times is typical as well.

As an integrated circuit has acquired large-scale integration and high-speed performance, a problem has occurred in an arrangement of the RAS mechanism. One reason is, although a circuit to be a target for pseudo error generation is required to be reachable from the pseudo error generating mechanism within one cycle of a operating frequency of the integrated circuit, a propagation delay of a signal of the pseudo error generation turns not to be disregarded as the integrated circuit has acquired large-scale integration and high-speed performance.

Arts related to the error controlling are discussed in Japanese Laid-open Patent Publications Nos. 56-021253, 64-082140, 01-261732, 58-039351, 59-087560 and 04-369046.

Embodiments described herein have been developed in view of the above and other problems of the typical system including for the purpose of providing an error controlling system, a processor and an error injection method for which the propagation delay of the signal of the pseudo error generation is considered.

According to an error controlling system, a processor and an error injection method disclosed herein, among others, an effect is obtained such that an error controlling system, a processor and an error injection method for which a propagation delay of a signal of the pseudo error generation is considered can be provided.

SUMMARY

According to an aspect of the invention, an error controlling system includes a plurality of error generation target circuits, a plurality of pseudo error generating devices each having a pseudo error content holding register that holds directed pseudo error content, each plurality of pseudo error generating device generates a pseudo error corresponding to a pseudo error content held in a respective pseudo error content holding register in at least one of data to be written to one of the plurality of error generation target circuits and data to be read from one of the plurality of error generation target circuits upon being directed to generate the pseudo error, and a pseudo error controlling device that directs the plurality of pseudo error generating devices to generate a pseudo error corresponding to a respective pseudo error content held in each of the pseudo error content holding register provided in each of the plurality of pseudo error generating devices.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 explains data included in a JTAG command;

DETAILED DESCRIPTION

Figure 1:
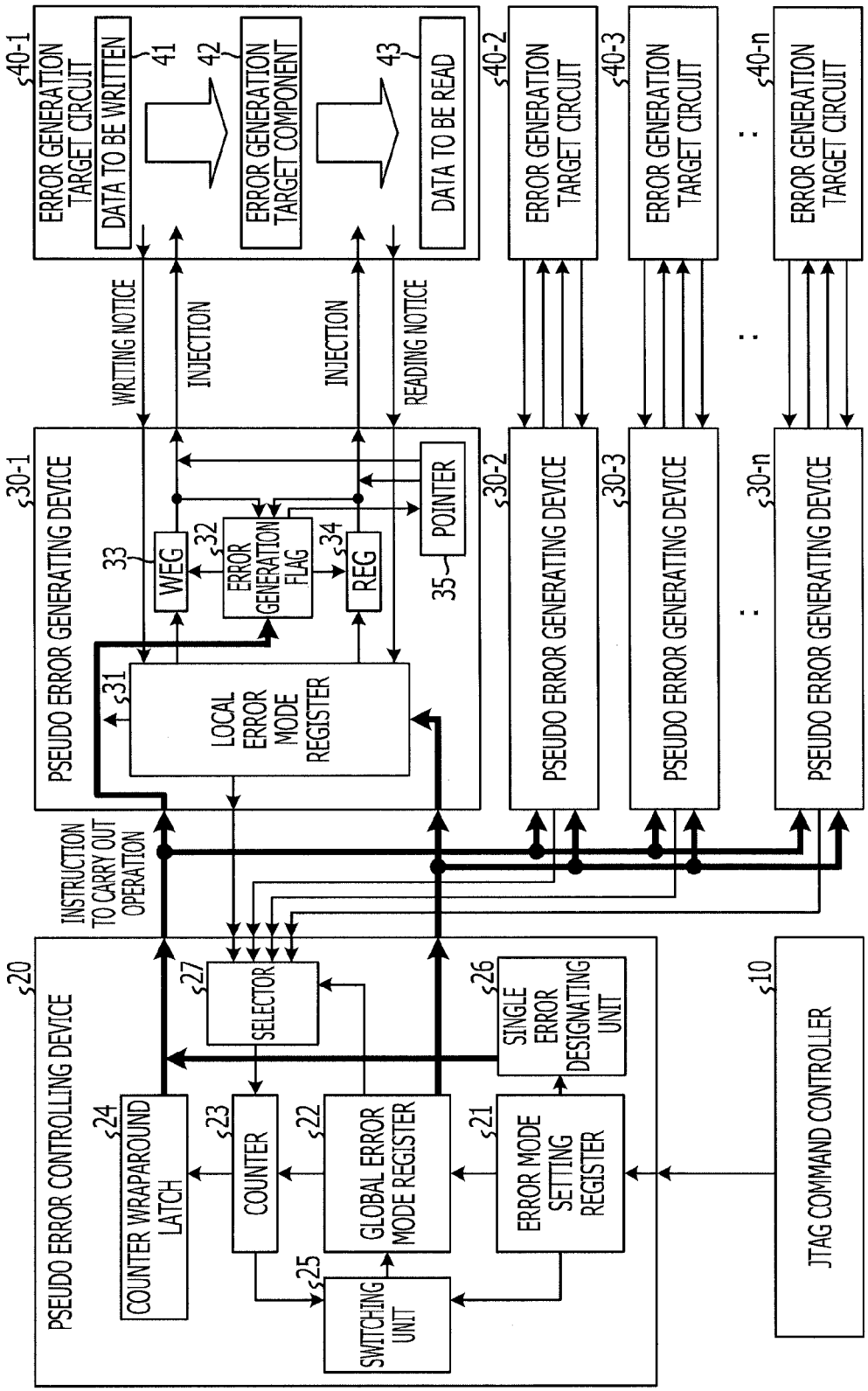
FIG. 1 is a schematic block diagram of an error controlling system of an embodiment.

Reference will now be made in detail to the embodiments, examples of which are illustrated in the accompanying drawings, wherein like reference numerals refer to the like elements throughout. The embodiments are described below to explain the present invention by referring to the figures.

An embodiment of an error controlling system, a processor and an error injection method disclosed herewith in the application will be explained in detail with reference to the drawings. Incidentally, the embodiment does not limit the disclosed art.

FIG. 1 is a schematic block diagram of the error controlling system of the embodiment. The error controlling system illustrated in FIG. 1 is an apparatus which generates pseudo errors in n-numbered error generation target circuits 40_1 to 40_n, and has a pseudo error controlling device 20 and pseudo error generating devices 30_1 to 30_n on a semiconductor chip.

The pseudo error generating device 30_1 is arranged on the semiconductor chip within a range corresponding to one cycle of the operating frequency of the semiconductor chip from the error generation target circuit 40_1, and generates a pseudo error in the error generation target circuit 40_1. The error generation target circuit 40_1 includes a component from and to which data can be read and written as an error generation target component therein. The pseudo error generating device 30_1 generates an error on written data 41 to be written to an error generation target component 42 or read data 43 to be read from the error generation target component 42.

The pseudo error generating devices 30_2 to 30_n are similarly arranged on the semiconductor chip within a range corresponding to one cycle of the operating frequency of the semiconductor chip from the error generation target circuits 40_2 to 40_n, and generate pseudo errors in the error generation targets circuits 40_2 to 40_n, respectively. The error generation target circuits 40_2 to 40_n each include a component from and to which data can be read and written as an error generation target component. The pseudo error generating devices 30_2 to 30_n each generate an error on data to be written to the error generation target component or data to be read from the error generation target component.

The pseudo error controlling device 20 is a device which directs the pseudo error generating devices 30_1 to 30_n content of the pseudo errors and to generate the pseudo errors. As described herein, the error controlling system disclosed by an embodiment separates the pseudo error controlling device 20 from the pseudo error generating devices. The pseudo error generating devices 30_1 to 30_n each hold the content of a pseudo error notified thereto by the pseudo error controlling device 20, and each generate the pseudo error upon being instructed to generate the pseudo error by the pseudo error controlling device 20.

The pseudo error generating devices 30_1 to 30_n being in charge of generating pseudo errors are arranged on the semiconductor chip within a range corresponding to one cycle of the operating frequency of the semiconductor chip from the error generation target circuits 40_1 to 40_n, respectively. According to the arrangement of an embodiment, a propagation delay from the pseudo error controlling device 20 to each of the pseudo error generating devices 30_1 to 30_n is not limited to one cycle of the operating frequency of the semiconductor chip. Thus, arrangement of the pseudo error controlling device 20 can be selected without a need to consider the propagation delay of a signal, so that a degree of freedom of the arrangement increases.

Figure 2:
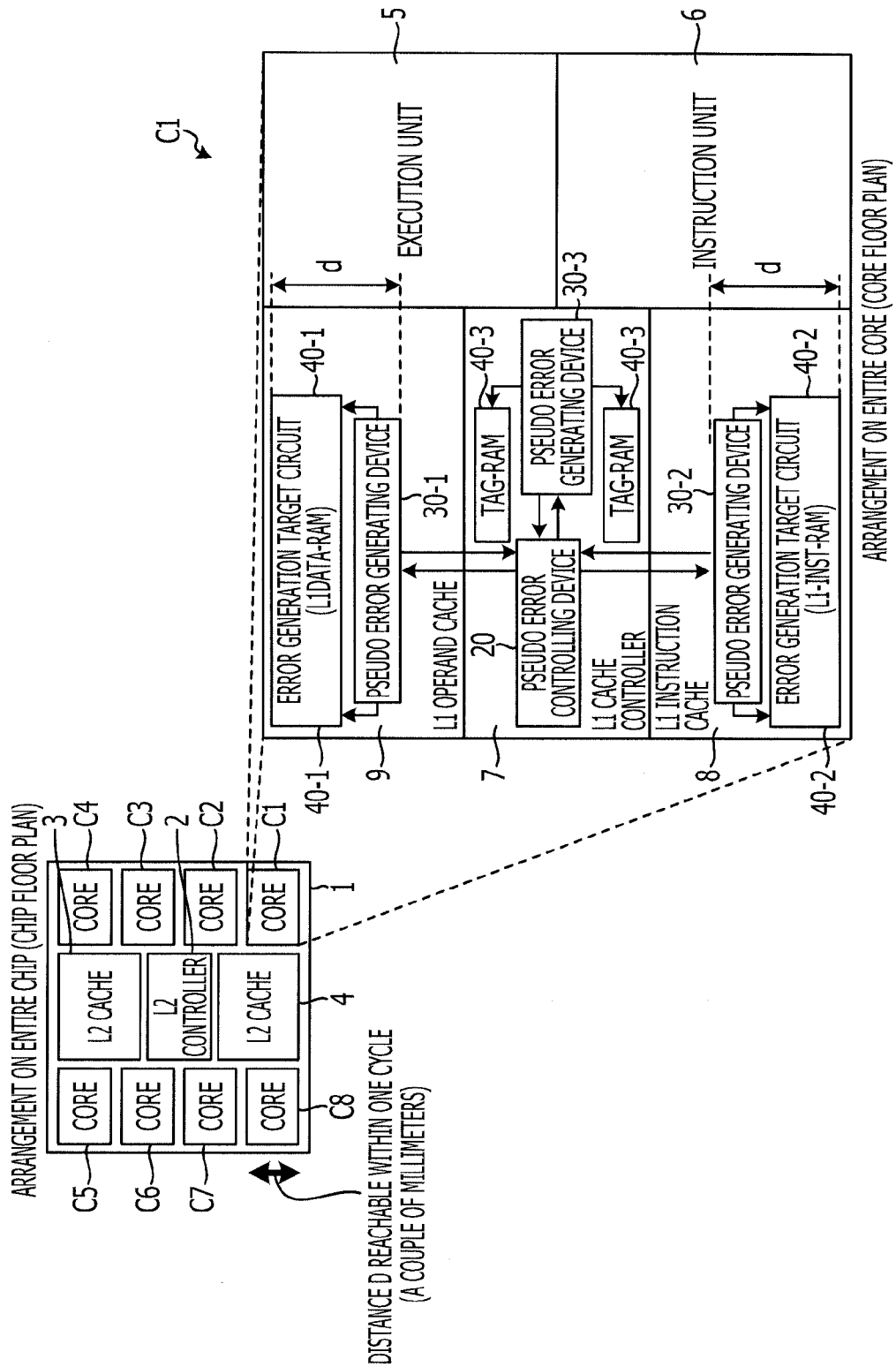
FIG. 2 illustrates an exemplary arrangement of an error controlling system of an embodiment.

FIG. 2 illustrates an exemplary arrangement of an error controlling system of an embodiment. FIG. 2 illustrates a CPU chip 1 having eight processor cores C1 to C8, L2 cache memories (level 2 Cache Memories as secondary cache memories) 3 and 4, and an L2 controller 2. The processor cores C1 to C8 each include an execution unit, an instruction unit and an L1 cache memory (Level-1 Cache Memory as a primary cache memory) therein. The processor cores C1 to C8 share the L2 cache memories (Level-2 Cache Memories) 3 and 4. The L2 controller 2 manages a cache state in which the processor cores C1 to C8 use the L2 cache memories 3 and 4.

FIG. 2 illustrates a configuration of the processor core C1, one of the processor cores C1 to C8, and illustration of the processor cores C2 to C8 having similar configurations is omitted. The processor core C1 includes therein an execution unit 5, an instruction unit 6, an L1 cache controller 7, an L1 instruction cache memory 8 and an L1 operand cache memory (Level-1 Operand Cache Memory) 9.

The L1 operand cache memory 9 has a memory from and to which data can be read and written, and uses the memory as an L1-DATA-RAM (Level-1 DATA Random Access Memory). The L1-DATA-RAM is the error generation target circuit 40_1. The pseudo error generating device 30_1 which generates a pseudo error in the error generation target circuit 40_1 is arranged within a distance d so as to be reachable from the error generation target circuit 40_1 within one cycle of the operating frequency of the semiconductor chip.

The L1 instruction cache memory 8 has a memory from and to which data can be read and written, and uses the memory as an L1-INST-RAM (Level-1 Instruction Random Access Memory). The L1-INST-RAM is the error generation target circuit 40_2. The pseudo error generating device 30_2 which generates a pseudo error in the error generation target circuit 40_2 is arranged on the CPU chip within the distance "d" so as to be reachable from the error generation target circuit 40_2 within one cycle of the operating frequency of the semiconductor chip.

The L1 cache controller 7 manages a cache state in which the L1 instruction cache memory 8 and the L1 operand cache memory 9 are accessed, and has a TAG-RAM as a memory that holds a tag for cache memory management. The TAG-RAM is the error generation target circuit 40_3. The pseudo error generating device 30_3 which generates a pseudo error in the error generation target circuit 40_3 is arranged on the CPU chip within the distance d so as to be reachable from the error generation target circuit 40_3 within one cycle of the operating frequency of the semiconductor chip.

Further, the L1 cache controller 7 has the pseudo error controlling device 20 which is connected to the pseudo error generating devices 30_1 to 30_3. A distance between the pseudo error controlling device 20 and each of the pseudo error generating devices 30_1 to 30_3 is allowed to be longer than the distance "d".

Return to FIG. 1, so that configurations of the pseudo error controlling device 20 and the pseudo error generating devices 30_1 to 30_3 will further be explained. Incidentally, as the pseudo error generating devices 30_1 to 30_3 are of a same configuration, the pseudo error generating device 30_1 will be explained as an example.

The pseudo error controlling device 20 has an error mode setting register 21, a global error mode register 22, a counter 23, a counter wraparound latch 24, a switching unit 25, a single error designating unit 26 and a selector 27. The pseudo error controlling device 20 accepts a JTAG (Joint Test Action Group) command from a JTAG command controller 10 specified in accordance with IEEE 1149.1 as to an LSI test.

The JTAG command designates content of a pseudo error to be generated. FIG. 3 explains data included in the JTAG command. The JTAG command that the JTAG command controller 10 sends to the pseudo error controlling device 20 includes, for example, data concerning the error generation target device, a number of times of pseudo error generation, a pseudo error generation target bit and whether a pseudo error is generated in a writing or reading access.

Further, the JTAG command controller 10 sends a JTAG command to the pseudo error generating devices 30_1 to 30_n as well, as described in detail below. The JTAG command that the JTAG command controller 10 sends to the pseudo error generating devices 30_1 to 30_n includes data concerning an address on which the pseudo error is generated, a WAY number of the device in which the pseudo error is generated and an event in which the pseudo error is generated, etc. While specific contents of the JTAG commend are discussed herein, the present invention is not limited thereto.

The address on which the pseudo error is generated specifies, in a case where the error generation target device is a RAM, an access address to the RAM on which the pseudo error is generated. Further, the WAY number of the device in which the pseudo error is generated specifies, in a case where the error generation target device is a set-associative RAM, a WAY of the RAM in which the pseudo error is generated. The event in which the pseudo error is generated specifies, in an access pipeline of the RAM, a pipeline request type of the RAM in which the pseudo error is generated.

Return to FIG. 1, so that the explanation of the pseudo error controlling device 20 will be continued. The error mode setting register 21 holds the data indicated by the JTAG command. The global error mode register 22 holds data for choosing one of the error generation target devices to be a target in which an error is generated, the pseudo error generation target bit and data as to whether the pseudo error is generated in a writing or reading access. The pseudo error controlling device 20 notifies the error generation target device chosen by the global error mode register 22 of the pseudo error generation target bit and whether the pseudo error is generated in a write or a read access.

The single error designating unit 26 is a processing unit which designates that an error generating operation be carried out in a case where a pseudo error is generated only once. To put it specifically, if a number of times of the pseudo error generation held by the error mode setting register 21 is one, the single error designating unit 26 outputs an instruction to carry out the operation to the chosen error generation target circuit after the content in the global error mode register 22 is notified to the pseudo error generating device 30_1.

The selector 27 is notified of event occurrences by the pseudo error generating devices 30_1 to 30_n, chooses an event occurrence notice from the pseudo error generating device registered in the global error mode register 22 and outputs the chosen notice to the counter 23. The counter 23 incrementally updates a counted value every time the counter 23 receives the output of the selector 27.

The counter wraparound latch 24 indicates "1" only during one cycle of the operating frequency of the semiconductor chip in a case where the value counted by the counter 23 reaches a first specified value. Then, upon indicating "1", the counter wraparound latch 24 outputs an instruction to carry out the operation to the error generation target device indicated by the global error mode register 22. Incidentally, the first specified value can be, e.g., a maximum value counted by the counter 23. The counter 23 counts up to the maximum value, e.g., 255 and is reset to zero upon having counted up to 255.

The counter 23 incrementally updates the counted value every time a target event occurs in a target device. Thus, if the counter 23 counts up to the maximum value 255, the counter wraparound latch 24 indicates "1" on every 256-th occurrence of the target event in the target device. As a result, the counter wraparound latch 24 outputs an instruction to carry out the operation to the error generation target device on every 256-th occurrence of the target event in the target device. Further, if the value specified for the counter is the minimum value, the counter wraparound latch is controlled so as to be set all the time as the counter 23 reaches the specified value every cycle. The counter wraparound latch can thereby be instructed to be kept on.

The switching unit 25 carries out a process for switching the pseudo error generating devices designated by the global error mode register 22 in a case where the value counted by the counter 23 reaches a second specified value. To put it specifically, in a case where a plurality of error generating devices is specified as an error generation target on the error mode setting register, the switching unit 25 sets data indicating the pseudo error generating device having been specified by the global error mode register 22 at a point of time when the counter 23 reaches the specified value as data specifying a next pseudo error generating device. Upon setting the data specifying the next pseudo error generating device, the switching unit 25 switches in turn the error generating device chosen by the global error mode register 22 from a plurality of error generating devices specified as the error generation target.

Further, in a case where the counter 23 reaches the second specified value in a state in which the global error mode register 22 indicates a final error target in a group to be a pseudo error target, data indicating an initial device of the specified device group is set to the global error mode register 22. As error targets are switched in turn, a pseudo error is injected into the error target switched thereto. It can thereby be instructed that the pseudo error be injected into a plurality of the pseudo error generating devices.

Thus, if the maximum value of the counter 23 is 255 and the second specified value is 127, e.g., the error generating devices to be chosen are switched on every 256-th occurrence of the target event in the target device.

The pseudo error generating device 30_1 has a local error mode register 31, an error generation flag 32, a write-error generator (WEG) 33, a read-error generator (REG) 34 and a pointer 35.

The local error mode register 31 receives a notice from the pseudo error controlling device 20 and holds the content of the notice. To put it specifically, the local error mode register 31 holds data of the pseudo error generating bit and as to whether the pseudo error is generated in a writing or reading access from the content held by the global error mode register 22.

Further, if an error target event occurs from an error generation target circuit, the local error mode register 31 notifies the pseudo error controlling device 20 of the event occurrence. To put it specifically, if a writing process occurs in the error generation target circuit in a state in which it is indicated that the pseudo error is generated in the writing access, the local error mode register 31 notifies the selector 27 of the pseudo error controlling device 20 of the writing process occurrence. If a reading process occurs in the error generation target circuit in a state in which it is indicated that the pseudo error is generated in the reading access, the local error mode register 31 similarly notifies the selector 27 of the pseudo error controlling device 20 of the reading process occurrence. Incidentally, if the JTAG command controller 10 has specified a pipeline request type as an event for generating a pseudo error and if the specified pipeline request takes place, the local error mode register 31 notifies the pseudo error controlling device 20 of the pipeline request.

The write-error generator 33 is a processor which produces an error to be generated on data written to the error generation target device. Further, the read-error generator 34 is a processor which produces an error to be generated on data read from the error generation target device.

The pointer 35 is used for specifying an error generation target component when the error generation target circuit 40_1 includes a plurality of error generation target components therein. The pointer 35 is used in some cases for switching the pseudo error generating bits even if the error generation target circuit 40_1 includes one error generation target component. For instance, use the pointer for an error generation target component holding 64-bit wide data and integrate pseudo errors while switching where to inject the pseudo errors in the 64 bits in turn, so that the pseudo errors can be generated on all the 64 bits.

To put it specifically, the pointer 35 can specify an initial value of the pointer by means of an address on which a pseudo error specified by the JTAG command from the JTAG command controller 10 is generated and the WAY number of a device in which the pseudo error is generated. Then, the value of the pointer 35 is updated every time the error generation flag 32 is set, and all the error generation target components can successively be indicated.

The error generation flag 32 is a flag to be set upon the pseudo error generating device 30_1 being instructed to carry out the operation by the counter wraparound latch 24 or the single error designating unit 26. After the error generation flag 32 being set followed by an occurrence of an event being an error generation target, the pseudo error generating device 30_1 generates an error in the event.

That is, when the error generation flag 32 in the error generating device indicates "1", the pseudo error generating device 30_1 continues to inject pseudo errors into data to be written to the error generation target component in accordance with the data stored in the local error mode register 31 upon the writing error having been specified. Upon injecting the pseudo error, i.e., upon the writing error having been specified by the local error mode register 31 when receiving a writing notice from the error generation target circuit, the pseudo error generating device 30_1 resets the error generation flag 32 to "0". The error generation flag 32 gives a setting operation priority, and is set to "1" if conditions for setting the flag to "1" and setting the flag to "0" are implemented at the same time. The pseudo error generating device 30_1 can thereby write the pseudo error data to the error generation target component just once after setting the error generation flag 32 to "1".

Figure 4:
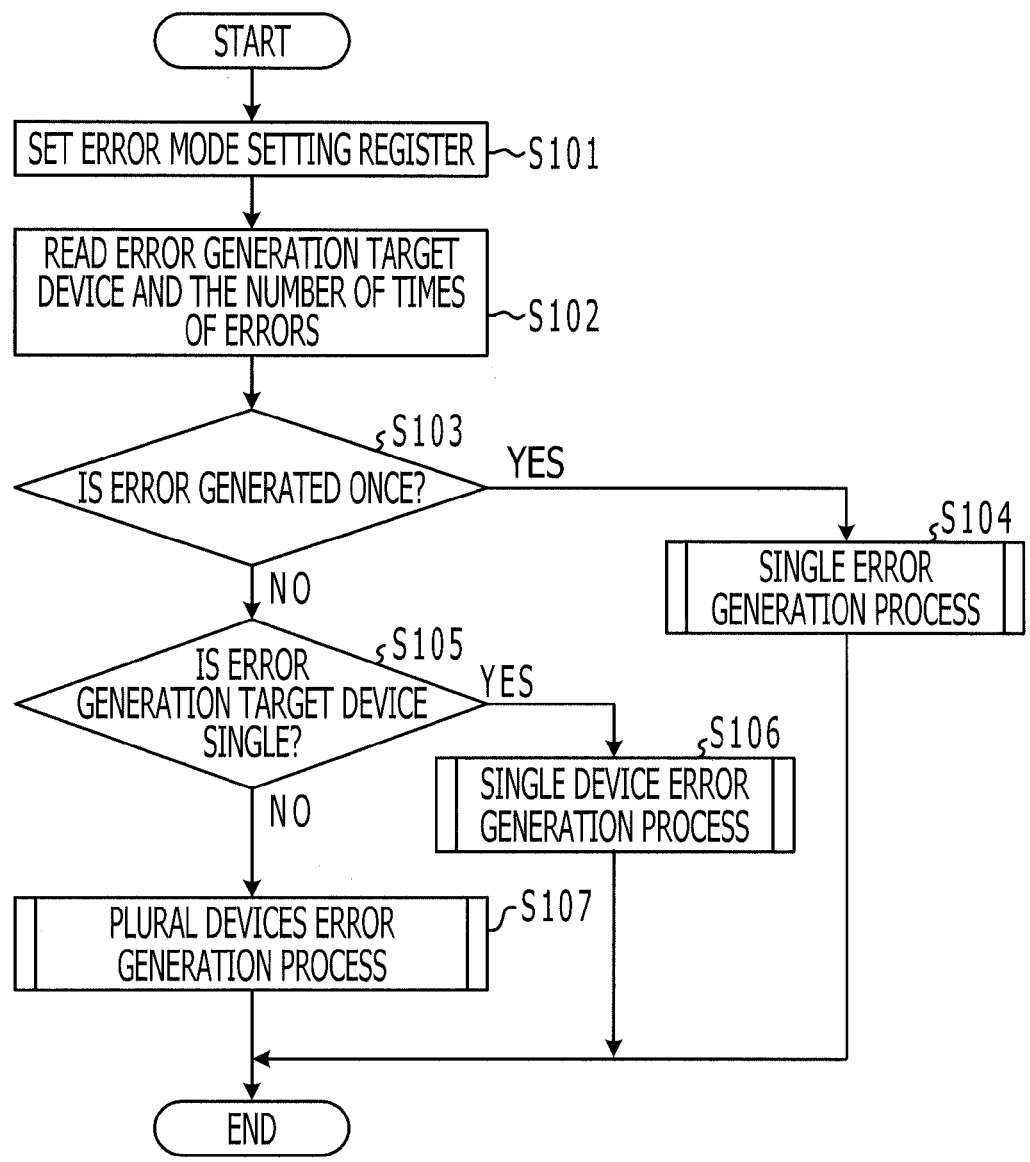
FIG. 4 is a flowchart for illustrating a processing operation of a pseudo error controlling device.

FIG. 4 is a flowchart for illustrating a processing operation of the pseudo error controlling device 20. The pseudo error controlling device 20 sets the content of the JTAG command received from the JTAG command controller 10 to the error mode setting register 21 (S101). Then, the pseudo error controlling device 20 reads the error generation target device and the number of times of error generation from the error mode setting register 21 (S102).

If the number of times of error generation is one (S103, Yes), the pseudo error controlling device 20 carries out a single error generation process (S104) and ends the process. If the number of times of error generation is equal to or greater than two (S103, No), the pseudo error controlling device 20 identifies whether the number of the device to be a target for error generation is one (S105).

If a single device is a target for error generation (S105, Yes), the pseudo error controlling device 20 carries out a single device error generation process (S106) and ends the process. Then, if a plurality of devices are targets for error generation (S105, No), the pseudo error controlling device 20 carries out a plural devices error generation process (S107) and ends the process.

Figure 5:
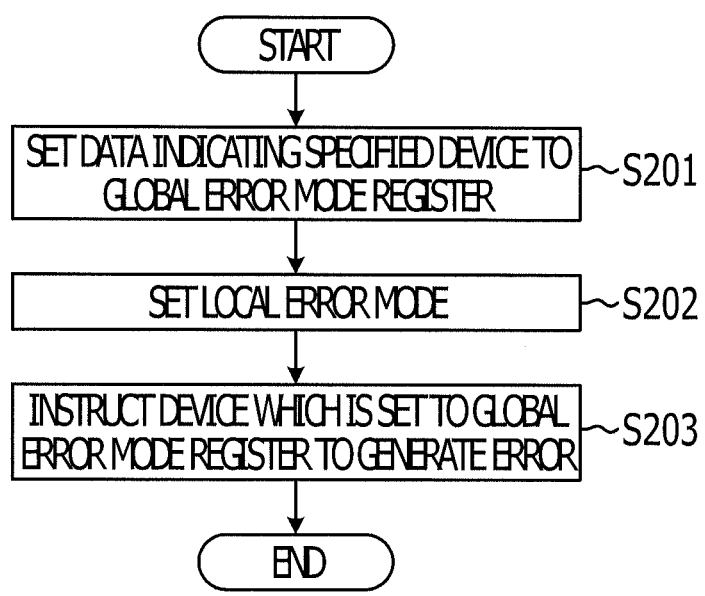
FIG. 5 is a flowchart of a single error generation process illustrated in FIG. 4.

FIG. 5 is a flowchart of the single error generation process illustrated in FIG. 4. If the single error generation process starts, the pseudo error controlling device 20 sets the global error mode register 22 at first (S201). Data indicating a single device specified as a target for error generation is set to the global error mode register 22, and so are the pseudo error generation target bit and data as to whether the pseudo error is generated in the writing or reading access.

The pseudo error controlling device 20 notifies the device specified by the global error mode register 22 of the pseudo error generation target bit and whether the pseudo error is generated in the writing or reading access, and makes the device set the local error mode register 31 (S202).

After the local error mode register 31 is set, the single error instruction unit 26 outputs an instruction to carry out error generation to the device set to the global error mode register 22 (S203), and ends the process.

Figure 6:
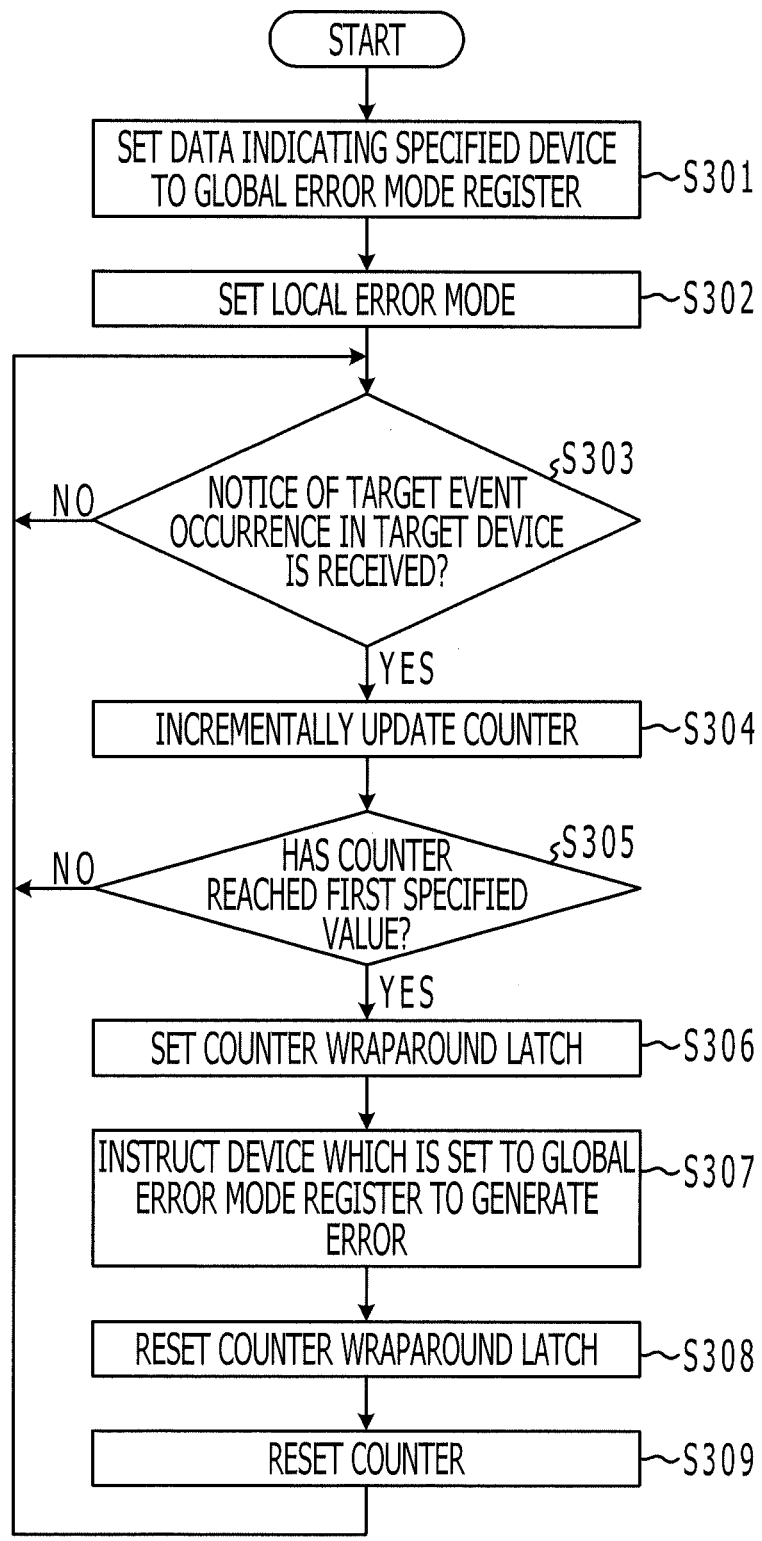
FIG. 6 is a flowchart of a single device error generation process illustrated in FIG. 4.

FIG. 6 is a flowchart of the single device error generation process illustrated in FIG. 4. If the single device error generation process starts, the pseudo error controlling device 20 sets the global error mode register 22 at first (S301). Data indicating a single device specified as a target for error generation is set to the global error mode register 22, and so are the pseudo error generation target bit and data as to whether the pseudo error is generated in the writing or reading access.

The pseudo error controlling device 20 notifies the device specified by the global error mode register 22 of the pseudo error generation target bit and whether the pseudo error is generated in the writing or reading access, and makes the device set the local error mode register 31 (S302).

After the local error mode register 31 is set, the selector 27 observes whether a notice of the target event occurrence is received from the target device (S303). Upon receiving the notice of the target event occurrence (S303, Yes), the selector 27 incrementally updates the counter 23 (S304).

If the counter 23 reaches the first specified value (S305, Yes), the pseudo error controlling device 20 sets the counter wraparound latch 24 (S306), and outputs an instruction to carry out error generation to the device set to the global error mode register 22 (S307). The pseudo error controlling device 20 resets the counter wraparound latch 24 after the instruction to carry out error generation (S308), resets the counter 23 (S309) and returns to observation of the notice of the target event occurrence coming from the target device (S303). Further, upon receiving a command from the JTAG command controller 10 to instruct that the pseudo error generation end, the pseudo error controlling device 20 ends the single device error generation process.

Figure 7:
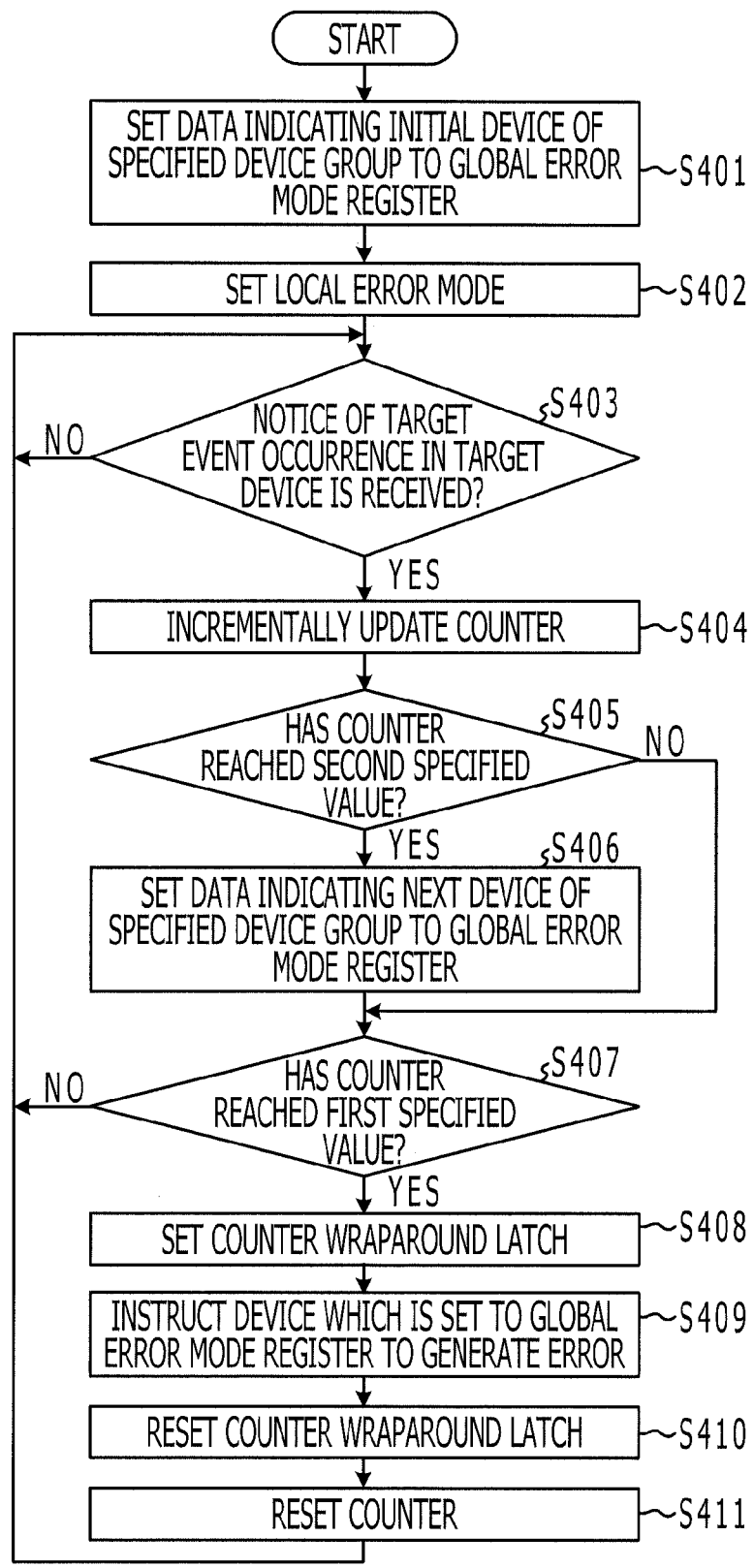
FIG. 7 is a flowchart of a plural devices error generation process illustrated in FIG. 4.

FIG. 7 is a flowchart of the plural devices error generation process illustrated in FIG. 4. If the plural devices error generation process starts, the pseudo error controlling device 20 sets the global error mode register 22 at first (S401). Data indicating an initial device of a device group specified as a target for error generation is set to the global error mode register 22, and so are the pseudo error generation target bit and data as to whether the pseudo error is generated in the writing or reading access.

The pseudo error controlling device 20 notifies the device specified by the global error mode register 22 of the pseudo error generation target bit and whether the pseudo error is generated in the writing or reading access, and makes the device set the local error mode register 31 (S402).

After the local error mode register 31 is set, the selector 27 observes whether a notice of the target event occurrence is received from the target device (S403). Upon receiving the notice of the target event occurrence (S403, Yes), the selector 27 incrementally updates the counter 23 (S404).

If the counter 23 reaches the second specified value (S405, Yes), the switching unit 25 changes the device specified by the global error mode register 22 (S406). To put it specifically, the switching unit 25 changes over to a device next to the device being specified by the global error mode register 22 in the device group specified by the error mode setting register 21 as the error generation target.

After changing the device specified by the global error mode register 22, or unless the counter reaches the second specified value, the pseudo error controlling device 20 compares the counted value with the first specified value (S407).

If the counter 23 reaches the first specified value (S407, Yes), the pseudo error controlling device 20 sets the counter wraparound latch 24 (S408), and outputs an instruction to carry out error generation to the device set to the global error mode register 22 (S409). The pseudo error controlling device 20 resets the counter wraparound latch 24 after the instruction to carry out error generation (S410), resets the counter 23 (S411) and returns to observation of the notice of the target event occurrence in the target device (S403). Further, upon receiving a command from the JTAG command controller 10 to instruct that the pseudo error generation end, the pseudo error controlling device 20 ends the plural devices error generation process.

Figure 8:
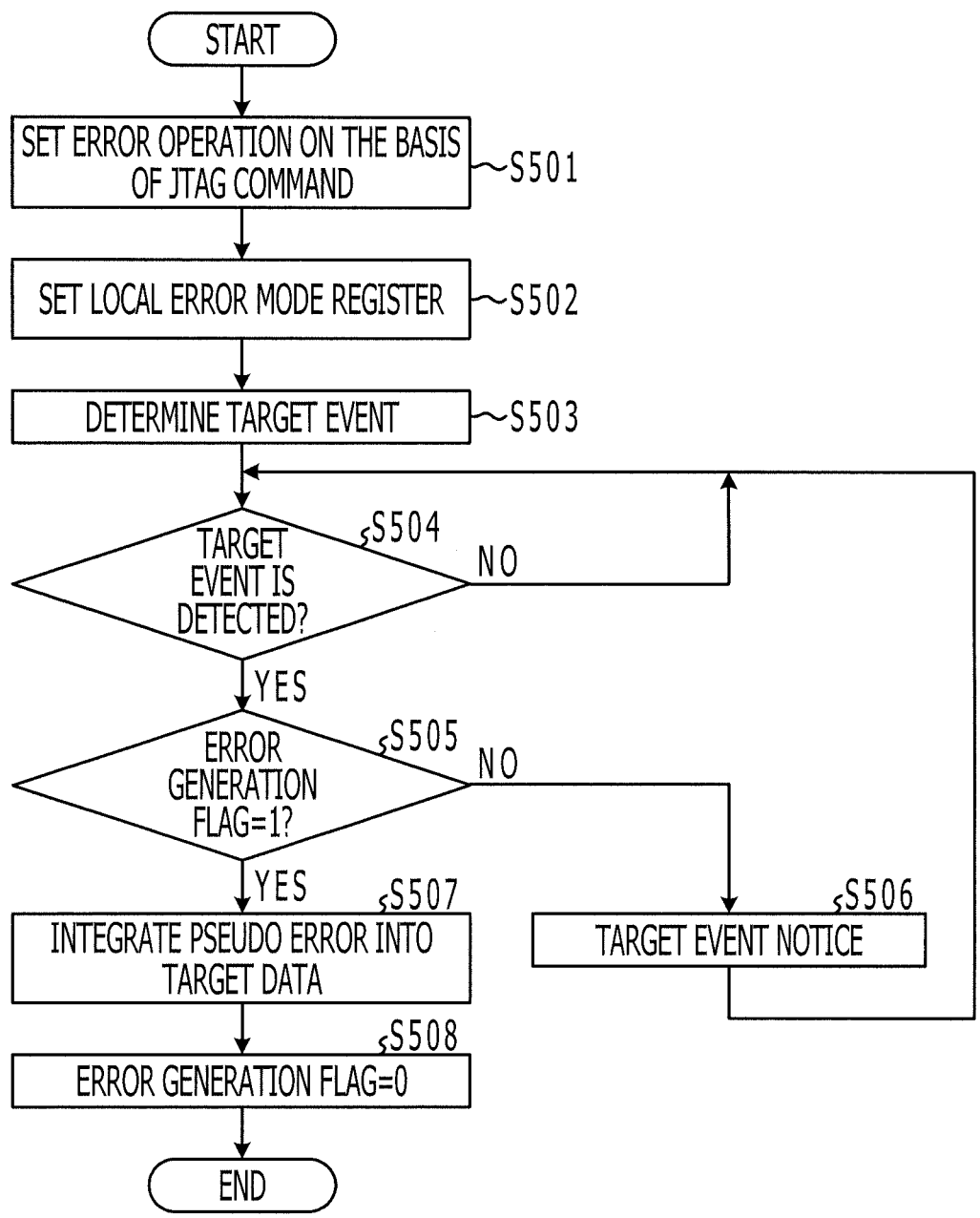
FIG. 8 is a flowchart for illustrating a processing operation of a pseudo error generating device.

FIG. 8 is a flowchart for illustrating a processing operation of the pseudo error generating device 30_1. The pseudo error generating device 30_1 sets error operations such as the address on which the pseudo error is generated, the WAY number and the event request type on the basis of the JTAG command received from the JTAG command controller 10 (S501). Further, upon being notified by the pseudo error controlling device 20, the pseudo error generating device 30_1 sets the local error mode register 31 (S502). The pseudo error generation target bit and whether the pseudo error is generated in the writing or reading access are set to the local error mode register 31.

The pseudo error generating device 30_1 determines a target event on the basis of the local error mode register 31 (S503), and observes whether the target event has occurred in the error generation target circuit 40_1. To put it specifically, if the local error mode register 31 indicates that a pseudo error is generated in a writing access, the pseudo error generating device 30_1 observes a writing notice of the error generation target circuit 40_1. Similarly, if the local error mode register 31 indicates that a pseudo error is generated in a reading access, the pseudo error generating device 30_1 observes a reading notice of the error generation target circuit 40_1.

Upon detecting the target event (S504, Yes), the pseudo error generating device 30_1 identifies whether the error generation flag 32 has been set to "1" (S505). If the error generation flag 32 has not been set to "1" (S505, No), the pseudo error generating device 30_1 notifies the pseudo error controlling device 20 of the occurrence of the target event (S506), and returns to detection of a target event (S503).

Meanwhile, if the error generation flag 32 has been set to "1" (S505, Yes), the pseudo error generating device 30_1 integrates a pseudo error into the target data (S507), resets the error generation flag 32 to "0" (S508) and ends the process.

Figure 9:
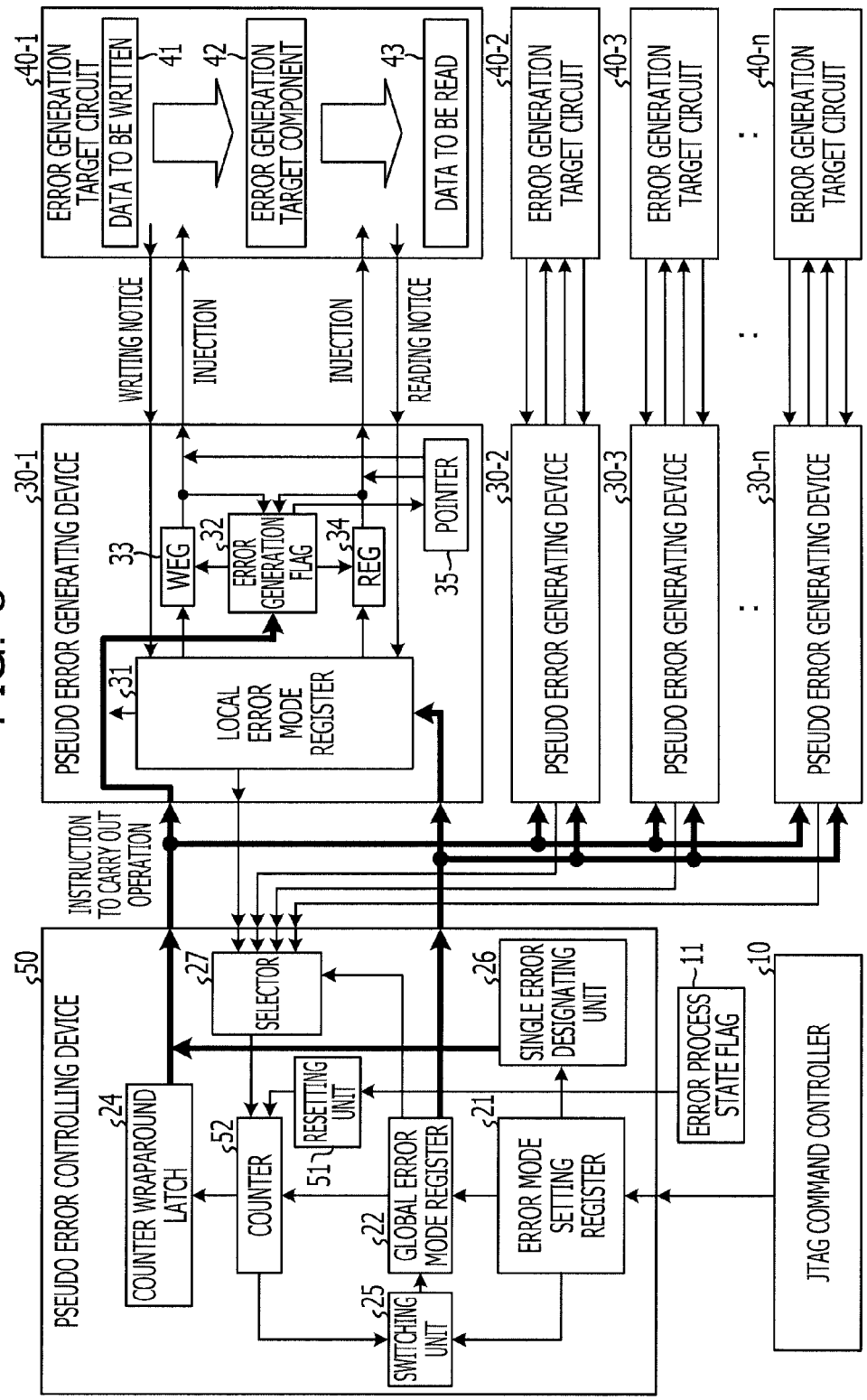
FIG. 9 illustrates an error controlling system having a configuration for stopping a counter.

The configuration for controlling the timing of error generation by means of the counter has already been explained, and a configuration provided with a function for stopping updating the counter will be explained. FIG. 9 illustrates an error controlling system having a configuration for stopping a counter.

In the configuration illustrated in FIG. 9, a pseudo error controlling device 50 is provided with a resetting unit 51. The resetting unit 51 is a processing unit which observes an error process state flag 11 and resets a counter 52. As other portions and their operations are same as those of the error controlling system illustrated in FIG. 1, the same portions are given same reference numerals and their explanations are omitted.

The counter 52 has a function for stopping being updated if particular conditions are fulfilled. The counter wraparound latch 24 set to "1" or turned on, e.g., triggers time observation, and the counter 52 stops being updated for a specified period of time. As the counter stops being updated for a specified period of time, the counter wraparound latch 24 can be prevented from being turned on more frequently than necessary, and can output instructions to carry out error generation to the pseudo error generation device less frequently. This function is made effective in a case where the device freezes as the instructions to generate errors are too frequent.

Further, if the device is in an error recovery process, the error process state flag 11 indicating that the device is in the error recovery process is turned on. If the state flag indicating that the device is in the error recovery process is kept on, the resetting unit 51 continuously resets the counter 52 to "0". This function prevents the counter 52 from wrapping around in the error recovery process, and prevents the counter wraparound latch 24 from being turned on again just after the recovery from the error. A freeze on the device caused by the error recovery process continuously running in normal operation can thereby be prevented. Incidentally, although it is assumed herein for explanation that the resetting unit 51 resets the counter 52, a configuration such that the counter 52 stops working while the error process state flag 11 is kept on can be allowed.

Further, a configuration is allowed such that a process for separating part of the error generation target components carried out as pseudo errors are frequently generated in the error generation target components triggers prevention of a mode for instructing the counter to be updated every cycle. According to such a configuration, if it has been instructed that an error be injected every cycle at the frequency of the pseudo error generation having been set to the error mode setting register 21, a state in which the device freezes as the errors are continuously generated can be prevented. To put it specifically, after carrying out the process for separating part of the error generation target components, change the frequency of error generation to a regularly specified value. Even if it is instructed that an error be generated every cycle, the device can thereby be controlled so that the device continuously works if separation of error components occurs.

Figure 10:
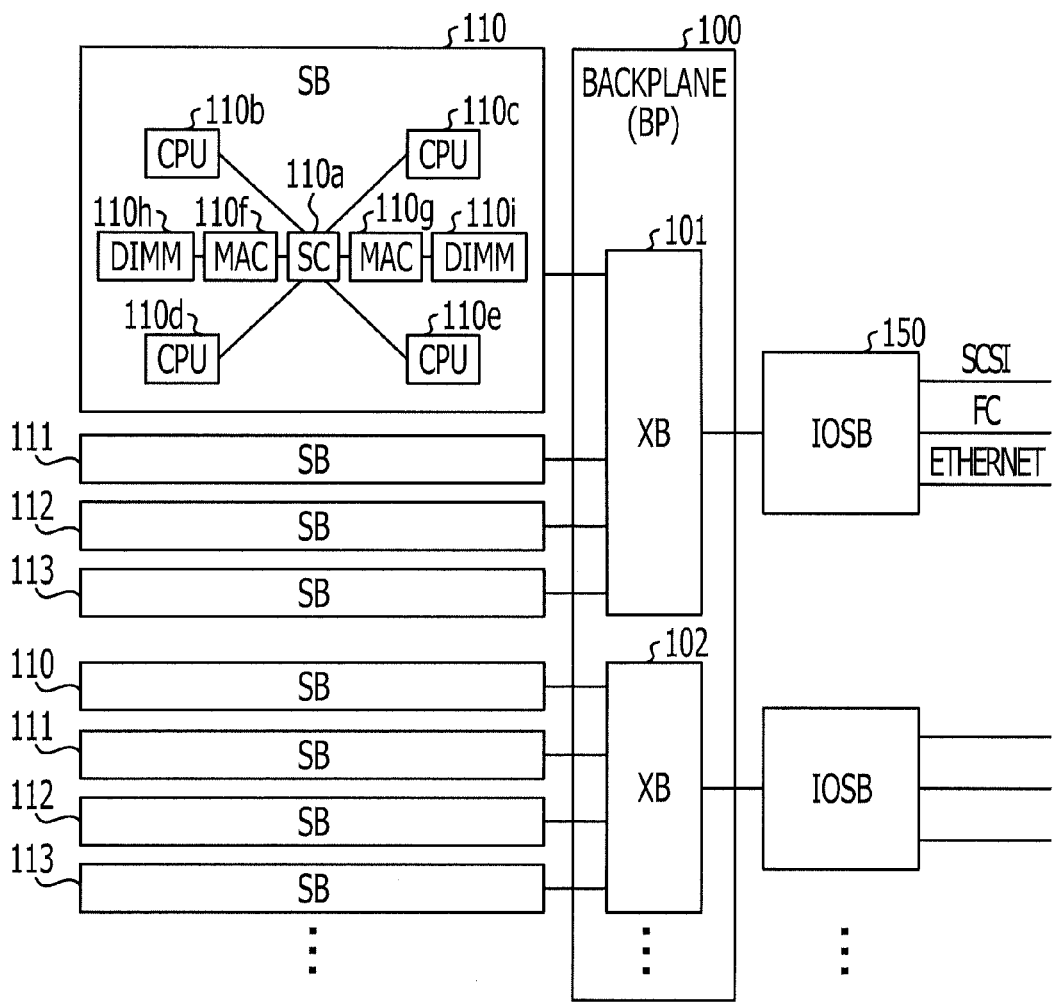
FIG. 10 illustrates a configuration of a server.

FIG. 10 illustrates a configuration of a server into which a processor disclosed by an embodiment is integrated. FIG. 10 illustrates the configuration of the server according to an embodiment. As illustrated in FIG. 10, the server has a plurality of crossbar switches such as XB101 and XB102 on a backplane 100, and has system boards SB110-SB113 and an Input Output System Board (IOSB150) for each of the crossbar switches. Incidentally, the numbers of the crossbar switches, the system boards and the Input Output System Board are exemplary only, and not limited to the above.

The backplane 100 is a circuit board on which a bus to interconnect a plurality of connectors, etc., with one another is formed. The crossbar switches XB101 and XB102 are switches to dynamically choose a path of data exchanged between the system boards and the Input Output System Board.

Further, as the system boards SB110, SB111, SB112 and SB 113 connected respectively to the crossbar switches XB101 and XB102 are electronic circuit boards to form an electronic apparatus and have similar configurations; only the SB110 will be explained herein. The SB110 has a system controller (SC) 110a, four CPUs, a memory access controller (MAC) and a DIMM (Dual Inline Memory Module).

The SC controls a process such as data transfer among the CPUs 110b to 110e, the MAC 110f and the MAC 110g mounted on the SB110 and controls the entire SB110. The CPUs 110b to 110e each are connected to another electronic apparatus through the SC, and are a processor having the error controlling system disclosed by an embodiment. The MAC 110f is connected between the DIMM 110h and the SC, and controls an access to the DIMM 110h. The MAC 110g is connected between the DIMM 110i and the SC, and controls an access to the DIMM 110i. The DIMM 110h is a memory module to be connected to another electronic apparatus through the SC and to be provided with a memory mounted thereon for a memory increase. The DIMM 110i is a memory module to be connected to another electronic apparatus through the SC and to be provided with a memory mounted thereon for a memory increase.

The IOSB 150 is connected respectively to the SB110 to SB113 through the XB101, and is connected to an input/output device through interfaces such as the SCSI (Small Computer System Interface), the FC (Fibre Channel) and the Ethernet (registered trademark). The IOSB 150 controls a process such as data transfer between the input/output device and the XB101. Incidentally, the electronic apparatus mounted on the SB110 such as CPU, MAC and DIMM are exemplary only, and the types or the number of the electronic apparatus are not limited to what is illustrated in FIG. 10.

According to an error controlling system, a processor and an error injection method of embodiments described above, the pseudo error generating device which generates a pseudo error is arranged close to the error generation target circuit, and the pseudo error controlling device is arranged apart from the pseudo error generating device. The error controlling system, the processor and the error injection method for which the propagation delay of the signal of the pseudo error generation is considered can thereby be obtained.

Generally, the pseudo error controlling device and the pseudo error generating device are designed to be integrated with each other as an error controlling system. The configuration such that the pseudo error controlling device and the pseudo error generating device are integrated with each other requires a design in consideration of propagation delay of control signals caused by the pseudo error controlling device and the error generation target circuit arranged far apart in order that an error generation system is designed by the use of an LSI, and makes the design of the pseudo error generating device difficult.

Meanwhile, the system having the disclosed configuration is designed in such a way that the pseudo error controlling device and the pseudo error generating device are separated from each other, that the both are provided with the error mode registers and that the error generation is carried out including by means of a flag. Then, the system is controlled in such a way that an error generation target event and an error generation instruction are transmitted by means of a signal to be made effective only for a period of time of one cycle of the operating frequency of the semiconductor chip, so that a time delay existing between the pseudo error controlling device and the pseudo error generation target circuit need not be considered and the design of the pseudo error generating device is facilitated.

Further, in order to enhance circuit examination capability, various error modes can be generated by an increase of error generation modes, resulting in an extension of time required for circuit examination.

According to the disclosed configuration, meanwhile, a register for error modes in the pseudo error controlling device is divided into the error mode setting register which directs an error mode from the JTAG command and the error mode register which directs the pseudo error generating device an error mode. Then, the error mode setting register instructs that the error mode be automatically changed, updates the error mode register upon the counter of the error generation event reaching the specified value, and changes the error mode so as to tell the pseudo error generating device another error mode.

As a plurality of error instructions is provided as an error mode from the JTAG command so that the plural error modes are automatically changed to be carried out, time and procedures required for a device test by the use of the pseudo error generating device can be shortened.

Further, the pseudo error generating device is required to be controlled so as to prevent a freeze caused by pseudo error generation and not by hardware bug. Thus, the disclosed configuration incorporates an anti-freeze circuit according to freeze conditions caused by error generation and not by a hardware bug. To put it specifically, the error generation event counter is prevented from being updated in the middle of the recovery process from an error. Or, the error generation event counter is prevented from being updated for a certain period of time just after the error generation. The counter operation can be prescribed as described herein, so that the error generation event counter can be prevented from wrapping around in the middle of the recovery process from an error, and that the pseudo error generating device can be prevented from generating an error again to cause a freeze upon trying to carry out the instruction after the end of the error recovery. The pseudo error generating device can thereby be prevented from causing a freeze in the system being in normal operation.

According to an embodiment, an error controlling method is provided including arranging pseudo error generating device(s) within a range selected relative to an operating frequency of an error generation target circuit, thereby a propagation delay of a signal of pseudo error generation is considered in the error controlling.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An error controlling system, comprising:
a plurality of error generation target circuits each reading and writing data;
a plurality of pseudo error generating devices each having a pseudo error content holding register that holds directed pseudo error content, each plurality of pseudo error generating device generates a pseudo error corresponding to a pseudo error content held in a respective pseudo error content holding register in at least one of data to be written to one of the plurality of error generation target circuits and data to be read from one of the plurality of error generation target circuits upon being directed to generate the pseudo error; and
a pseudo error controlling device that selectively directs one of the plurality of pseudo error generating devices to generate a pseudo error corresponding to a respective pseudo error content held in the respective pseudo error content holding register based on a distance between the one of the pseudo error generating devices and a pseudo error generation target.

2. The error controlling system according to claim 1, wherein each of the plurality of pseudo error generating devices detects an event occurrence of a pseudo error generation target indicated by a pseudo error content, and respectively notifies the pseudo error controlling device of the event occurrence of the pseudo error generation target; and
the pseudo error controlling device accumulates a number of times of the respectively notified the event occurrence of the pseudo error generation target, and respectively directs the plurality of pseudo error generating devices to generate a pseudo error when the accumulated number of times of the event occurrence of the pseudo error generation target reaches a designated number of times.

3. The error controlling system according to claim 2, wherein the pseudo error controlling device stops to accumulate the number of times of the respectively notified the event occurrence of the pseudo error generation target for a designated period of time after respectively directing the pseudo error generation.

4. The error controlling system according to claim 2, wherein the pseudo error controlling device stops to count the number of times of the notification from the error generation target circuit in which the pseudo error is generated for a period of time during which one of the plurality of error generation target circuits in which the pseudo error is generated recovers from the generated pseudo error.

5. The error controlling system according to claim 1, wherein the plurality of pseudo error generating devices each changes a generation target position of the pseudo error in the data to be written or read in which the pseudo error is generated every time generating the pseudo error.

6. The error controlling system according to claim 1, wherein the pseudo error controlling device has a pseudo error content controlling register that holds the pseudo error content, chooses one of the plurality of pseudo error generating devices, and reflects the content of the pseudo error content controlling register in the pseudo error content holding register of the chosen pseudo error generating device.

7. The error controlling system according to claim 6, wherein the pseudo error controlling device variably chooses one of the plurality of pseudo error generating devices in turn.

8. A processor having a plurality of processor cores with a secondary cache memory shared by the plurality of processor cores, each of the plurality of processor cores comprising:
a plurality of primary cache memories that hold part of data stored in secondary cache memories;
a plurality of pseudo error generating devices that each generate a pseudo error in at least one of data to be written to one of the plurality of primary cache memories and data to be read from one of the plurality of primary cache memories; and
a pseudo error controlling device that selectively directs one of the plurality of pseudo error generating devices to generate a pseudo error corresponding to a respective pseudo error content held based on a distance between the one of the pseudo error generating devices and a pseudo error generation target.

9. The processor according to claim 8, wherein each of the plurality of pseudo error generating devices detects an event occurrence of a pseudo error generation target indicated by a pseudo error content, and respectively notifies the pseudo error controlling device of the event occurrence of pseudo error generation target; and
the pseudo error controlling device accumulates a number of times of the respectively notified the event occurrence of the pseudo error generation target, and respectively directs the plurality of pseudo error generating devices to generate pseudo error when the accumulated number of times of the event occurrence of the pseudo error generation target reaches a designated number of times.

10. The processor according to claim 9, wherein the pseudo error controlling device stops to accumulate the number of times of the respectively notified the event occurrence of the pseudo error generation target for a designated period of time after respectively directing the pseudo error generation.

11. The processor according to claim 9, wherein the pseudo error controlling device stops to count the number of times of the notification from the error generation target circuit in which the pseudo error is generated for a period of time during which one of the plurality of error generation target circuits in which the pseudo error is generated recovers from the generated pseudo errors.

12. The processor according to claim 8, wherein the plurality of pseudo error generating devices each changes a generation target position of the pseudo error in the data to be written or read in which the pseudo error is generated every time generating the pseudo error.

13. The processor according to claim 8, wherein the pseudo error controlling device has a pseudo error content controlling register that holds the pseudo error content, chooses one of the plurality of pseudo error generating devices, and reflects the content of the pseudo error content controlling register in the pseudo error content holding register of the chosen pseudo error generating device.

14. The processor according to claim 13, wherein the pseudo error controlling device variably chooses one of the plurality of pseudo error generating devices in turn.

15. An error injection method of a plurality of error generation target circuits each reading and writing data, the error injection method comprising:
generating a pseudo error corresponding to a pseudo error content held in a pseudo error content holding register in at least one of data to be written to one of the plurality of error generation target circuits and data to be read from one of the plurality of error generation target circuits upon being directed to generate a pseudo error by a plurality of pseudo error generating devices; and selectively directing one of the plurality of pseudo error generating devices to generate a pseudo error corresponding to a respective pseudo error content held in the respective pseudo error content holding register based on a distance between the one of the pseudo error generating devices and a pseudo error generation target.

* * * * *